(12) United States Patent
Hadji et al.

(10) Patent No.: US 12,164,969 B2
(45) Date of Patent: Dec. 10, 2024

(54) METHOD AND SYSTEM FOR LEARNING TO TEMPORAL ALIGN SIGNALS WITH INTERSPERSED OUTLIERS

(71) Applicant: SAMSUNG ELECTRONICS CO., LTD., Suwon-si (KR)

(72) Inventors: Isma Hadji, Toronto (CA); Mikita Andreevich Dvornik, Toronto (CA); Konstantinos Derpanis, Toronto (CA); Allan Douglas Jepson, Oakville (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 447 days.

(21) Appl. No.: 17/563,813

(22) Filed: Dec. 28, 2021

(65) Prior Publication Data

US 2022/0237043 A1   Jul. 28, 2022

Related U.S. Application Data

(60) Provisional application No. 63/194,133, filed on May 27, 2021, provisional application No. 63/137,858, filed on Jan. 15, 2021.

(51) Int. Cl.
*G06F 9/50* (2006.01)
(52) U.S. Cl.
CPC ........ *G06F 9/5033* (2013.01); *G06F 2218/08* (2023.01)
(58) Field of Classification Search
CPC ... G06F 9/5033; G06F 2218/08; G06V 10/75; G06V 10/82; G06V 20/48
See application file for complete search history.

(56) References Cited

U.S. PATENT DOCUMENTS

| | | | |
|---|---|---|---|
| 8,205,148 B1 | 6/2012 | Sharpe et al. | |
| 9,025,908 B2 | 5/2015 | Vidal et al. | |
| 10,866,939 B2 | 12/2020 | Danichev et al. | |
| 2012/0092446 A1 | 4/2012 | Peleg et al. | |
| 2015/0189193 A1 | 7/2015 | Kappeler et al. | |
| 2016/0330399 A1* | 11/2016 | Joshi | H04N 5/77 |
| 2018/0176423 A1 | 6/2018 | Bazin et al. | |

(Continued)

FOREIGN PATENT DOCUMENTS

KR   10-1789979 B1   10/2017

OTHER PUBLICATIONS

Dvornik et al. "Drop-DTW: Aligning Common Signal Between Sequences While Dropping Outliers," Dec. 6 through Dec. 14, 2021, NeurIPS 2021 (Year: 2021).*

(Continued)

*Primary Examiner* — Sisley N Kim
(74) *Attorney, Agent, or Firm* — Sughrue Mion, PLLC

(57) ABSTRACT

A method is provided. The method includes receiving a first signal and a second signal, generating a first sequence based on the first signal by embedding at least one feature in the first signal, generating a second sequence based on the second signal by embedding at least one feature in the second signal, determining a minimum cost path of aligning the first sequence with the second sequence based on the embedded at least one feature in the first sequence and the embedded at least one feature in the second sequence, and aligning the first sequence with second sequence based on the determined minimum cost path.

11 Claims, 10 Drawing Sheets

(56) References Cited

U.S. PATENT DOCUMENTS

2020/0151860 A1   5/2020   Safdarnejad et al.

OTHER PUBLICATIONS

U.S. Appl. No. 18/103,101, filed Jan. 30, 2023.
International Search Report (PCT/ISA/210) issued May 3, 2022 by the International Searching Authority in counterpart International Application No. PCT/KR2022/000546.
Written Opinion (PCT/ISA/237) issued May 3, 2022 by the International Searching Authority in counterpart International Application No. PCT/KR2022/000546.
Chang, Chien-Yi et al., "D3TW: Discriminative Differentiable Dynamic Time Warping for Weakly Supervised Action Alignment and Segmentation", arXiv:1901.02598v1, [cs.CV], Jan. 9, 2019 (11 pages total).

\* cited by examiner

Algorithm 1 Subsequence alignment with Drop-DTW.

1: Inputs: $C \in \mathbb{R}^{K \times N}$ (pairwise match cost matrix), $d^z, d^x$ (drop costs for elements in $X$ and $Z$ respectively).
2: ▷ *initializing DP tables for storing the optimal alignment path costs with different ends match conditions*
3: $D^{xz}_{0,0} = 0; D^{xz}_{i,0} = \infty; D^{xz}_{0,j} = \infty;$    $i \in [K], j \in [N]$    ▷ *matching ends in $X$ and $Z$*
4: $D^{x\bar{z}}_{0,0} = 0; D^{x\bar{z}}_{i,0} = \infty; D^{x\bar{z}}_{0,j} = \sum_{k=1}^{j} d^z_k;$    $i \in [K], j \in [N]$    ▷ *dropping $X$'s end, but matching $Z$'s end*
5: $D^{\bar{x}z}_{0,0} = 0; D^{\bar{x}z}_{i,0} = \sum_{k=1}^{i} d^x_k; D^{\bar{x}z}_{0,j} = \infty;$    $i \in [K], j \in [N]$    ▷ *dropping $Z$'s end, but matching $X$'s end*
6: $D^{\bar{x}\bar{z}}_{0,0} = 0; D^{\bar{x}\bar{z}}_{i,0} = D^{\bar{x}z}_{i,0}; D^{\bar{x}\bar{z}}_{0,j} = D^{x\bar{z}}_{0,j};$    ▷ *dropping ends in $Z$ and $X$*
7:
8: for $i = 1, \ldots, K$ do    ▷ *iterating over elements in $Z$*
9:    for $j = 1, \ldots, N$ do    ▷ *iterating over elements in $X$*
10:      ▷ *grouping costs into neighboring sets for convenience*
11:      diag_cells = $\{D^{xz}_{i-1,j-1}, D^{\bar{x}z}_{i-1,j-1}, D^{x\bar{z}}_{i-1,j-1}, D^{\bar{x}\bar{z}}_{i-1,j-1}\}$
12:      left_cells_with_z = $\{D^{xz}_{i,j-1}, D^{\bar{x}z}_{i,j-1}\}$
13:      top_cells_with_x = $\{D^{xz}_{i-1,j}, D^{x\bar{z}}_{i-1,j}\}$
14:      left_cells_without_z = $\{D^{x\bar{z}}_{i,j-1}, D^{\bar{x}\bar{z}}_{i,j-1}\}$
15:      top_cells_without_x = $\{D^{\bar{x}z}_{i-1,j}, D^{\bar{x}\bar{z}}_{i-1,j}\}$
16:      ▷ *dynamic programming update on all tables*
17:      $D^{xz}_{i,j} = C_{i,j} + \min\{\text{diag\_cells} \cup \text{left\_cells\_with\_z} \cup \text{top\_cells\_with\_x}\}$    ▷ *consider matching $z_i$ to $x_j$*
18:      $D^{x\bar{z}}_{i,j} = d^z_i + \min\{\text{left\_cells\_with\_z}\}$    ▷ *consider dropping $x_j$*
19:      $D^{\bar{x}z}_{i,j} = d^x_i + \min\{\text{top\_cells\_with\_x}\}$    ▷ *consider dropping $z_i$*
20:      $D^{\bar{x}\bar{z}}_{i,j} = \min\{\text{top\_cells\_without\_x} \cup d^z_i \cup \text{left\_cells\_without\_x} \cup d^x_j\}$    ▷ *consider dropping $x_j$ and $z_i$*
21:      $D_{i,j} = \min\{D^{xz}_{i,j}, D^{x\bar{z}}_{i,j}, D^{\bar{x}z}_{i,j}, D^{\bar{x}\bar{z}}_{i,j}\}$    ▷ *select the optimal action*
22:    end for
23: end for
24: $M^* = \text{traceback}(D)$    ▷ *compute the optimal alignment by tracing back the minimum cost path*
25: Output: $D_{K,N}, M^*$

FIG. 6

Algorithm 2 Subsequence alignment with Drop-DTW.

1: Inputs: $C \in \mathbb{R}^{K \times N}$ (pairwise match cost matrix), $d^z, d^x$ (drop costs for elements in $X$ and $Z$ respectively).
2: ▷ *initializing DP tables for storing the optimal alignment path costs with different ends match conditions*
3: $D^{xz}_{0,0} = 0; D^{xz}_{i,0} = \infty; D^{xz}_{0,j} = \infty;$     $i \in [K], j \in [N]$
4: $D^{x\bar{z}}_{0,0} = 0; D^{x\bar{z}}_{i,0} = \infty; D^{x\bar{z}}_{0,j} = \sum_{k=1}^{j} d^x_k;$     $i \in [K], j \in [N]$
5: $D^{\bar{x}z}_{0,0} = 0; D^{\bar{x}z}_{i,0} = \sum_{k=1}^{i} d^z_k; D^{\bar{x}z}_{0,j} = \infty;$     $i \in [K], j \in [N]$
6: $D^{\bar{x}\bar{z}}_{0,0} = 0; D^{\bar{x}\bar{z}}_{i,0} = D^{\bar{x}z}_{i,0}; D^{\bar{x}\bar{z}}_{0,j} = D^{x\bar{z}}_{0,j};$     $i \in [K], j \in [N]$
7: ▷ *initializing path tables for storing the optimal predecessors*
8: $P^{xz}_{0,0} = P^{xz}_{i,j} = P^{xz}_{0,j} = (0,0);$     $i \in [K], j \in [N]$
9: $P^{x\bar{z}}_{i,0} = P^{x\bar{z}}_{i,0} = (i-1, 0);$     $i \in [K], j \in [N]$
10: $P^{\bar{x}z}_{0,j} = P^{\bar{x}z}_{0,j} = (0, j-1);$     $i \in [K], j \in [N]$
11:
12: for $i = 1, \ldots, K$ do
13:     for $j = 1, \ldots, N$ do
14:       ▷ *dynamic programming update on all tables*
15:       $D^{xz}_{i,j} = C_{i,j} + \min\{D^{xz}_{i-1,j-1}, D^{x\bar{z}}_{i-1,j-1}, D^{\bar{x}z}_{i-1,j-1}, D^{\bar{x}\bar{z}}_{i-1,j-1}\}$
16:       $D^{x\bar{z}}_{i,j} = d^x_j + \min\{D^{xz}_{i,j-1}, D^{x\bar{z}}_{i,j-1}\}$
17:       $D^{\bar{x}z}_{i,j} = d^z_i + \min\{D^{xz}_{i-1,j}, D^{\bar{x}z}_{i-1,j}\}$
18:       $D^{\bar{x}\bar{z}}_{i,j} = \min\{D^{\bar{x}z}_{i-1,j} + d^x_j, D^{\bar{x}\bar{z}}_{i,j-1} + d^x_j, D^{x\bar{z}}_{i,j-1} + d^z_i, D^{\bar{x}\bar{z}}_{i-1,j} + d^z_i\}$
19:       ▷ *recording the optimal predecessor for every DP table*
20:       $P^{xz}_{i,j} = \arg\min\{P^{xz}_{i-1,j-1}, P^{x\bar{z}}_{i-1,j-1}, P^{\bar{x}z}_{i-1,j-1}, P^{\bar{x}\bar{z}}_{i-1,j-1}\}$
21:       $P^{x\bar{z}}_{i,j} = \arg\min\{P^{xz}_{i,j-1}, P^{x\bar{z}}_{i,j-1}\}$
22:       $P^{\bar{x}z}_{i,j} = \arg\min\{P^{xz}_{i-1,j}, P^{\bar{x}z}_{i-1,j}\}$
23:       $P^{\bar{x}\bar{z}}_{i,j} = \arg\min\{P^{\bar{x}z}_{i-1,j} + d^x_j, P^{\bar{x}\bar{z}}_{i,j-1} + d^x_j, P^{x\bar{z}}_{i,j-1} + d^z_i, P^{\bar{x}\bar{z}}_{i-1,j} + d^z_i\}$
24:     end for
25: end for
26: min_alignment_cost = $\min\{D^{xz}_{K,N}, D^{x\bar{z}}_{K,N}, D^{\bar{x}z}_{K,N}, D^{\bar{x}\bar{z}}_{K,N}\}$     ▷ *optimal alignment cost*
27: last_optimal_predecessor = $\arg\min\{P^{xz}_{K,N}, P^{x\bar{z}}_{K,N}, P^{\bar{x}z}_{K,N}, P^{\bar{x}\bar{z}}_{K,N}\}$     ▷ *optimal predecessor at the end*
28: $M^* =$ traceback(last_optimal_predecessor)     ▷ *compute the optimal alignment by backtracking*
29: Output: min_alignment_cost, $M^*$

FIG. 8

METHOD AND SYSTEM FOR LEARNING TO TEMPORAL ALIGN SIGNALS WITH INTERSPERSED OUTLIERS

CROSS REFERENCE TO RELATED APPLICATIONS

This application is based on and claims priority under 35 U.S.C. § 119 to U.S. Provisional Application No. 63/194,133, filed on May 27, 2021 in the United States Patent and Trademark Office, and U.S. Provisional Application No. 63/137,858, filed on Jan. 15, 2021 in the United States Patent and Trademark Office, the disclosures of which are incorporated herein by reference in their entireties.

BACKGROUND

1. Field

The disclosure relates to a system and method for signal alignment.

2. Description of Related Art

In systems configured for temporal alignment of multiple signals, the system may attempt to align a first signal and a second signal. However, during signal alignment, the systems may not correctly align the signals. For example, such systems may not perform one-to-many matching or correctly identify interspersed outliers in the signals.

SUMMARY

In accordance with an aspect of the disclosure, a method may include receiving a first signal and a second signal, generating a first sequence based on the first signal by embedding at least one feature in the first signal, generating a second sequence based on the second signal by embedding at least one feature in the second signal, determining a minimum cost path of aligning the first sequence with the second sequence based on the embedded at least one feature in the first sequence and the embedded at least one feature in the second sequence, and aligning the first sequence with second sequence based on the determined minimum cost path.

In accordance with an aspect of the disclosure, a system may include a memory storing instructions, and a processor configured to execute the instructions to receive a first signal and a second signal, generate a first sequence based on the first signal by embedding at least one feature in the first signal, generate a second sequence based on the second signal by embedding at least one feature in the second signal, determine a minimum cost path of aligning the first sequence with the second sequence based on the embedded at least one feature in the first sequence and the embedded at least one feature in the second sequence, and align the first sequence with second sequence based on the determined minimum cost path.

In accordance with an aspect of the disclosure, a non-transitory computer-readable storage medium may be connected to at least one processor and may store instructions that, when executed, cause the at least one processor to receive a first signal and a second signal, generate a first sequence based on the first signal by embedding at least one feature in the first signal, generate a second sequence based on the second signal by embedding at least one feature in the second signal, determine a minimum cost path of aligning the first sequence with the second sequence based on the embedded at least one feature in the first sequence and the embedded at least one feature in the second sequence, and align the first sequence with second sequence based on the determined minimum cost path.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 6 is a diagram of algorithm for subsequence alignment, according to an embodiment;

FIG. 8 is a diagram of an algorithm for subsequence alignment, according to an embodiment;

DETAILED DESCRIPTION

The following detailed description of example embodiments refers to the accompanying drawings. The same reference numbers in different drawings may identify the same or similar elements.

Figure 1:
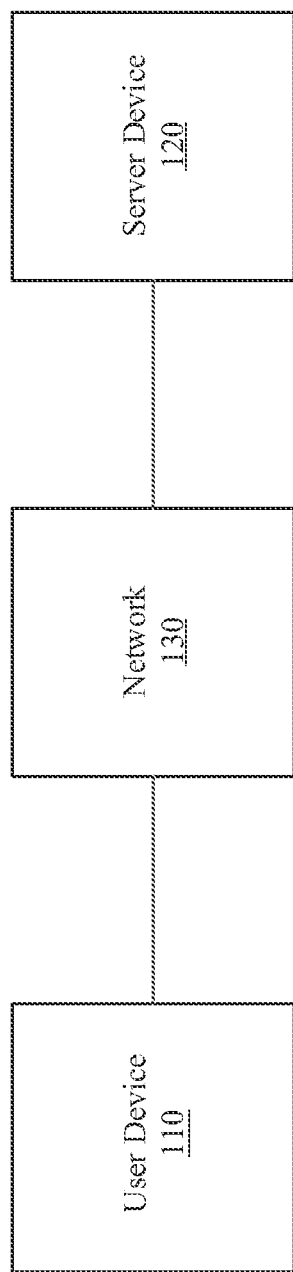
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 may include one or more devices. For example, the server device 120 may be a server device, a computing device, or the like.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
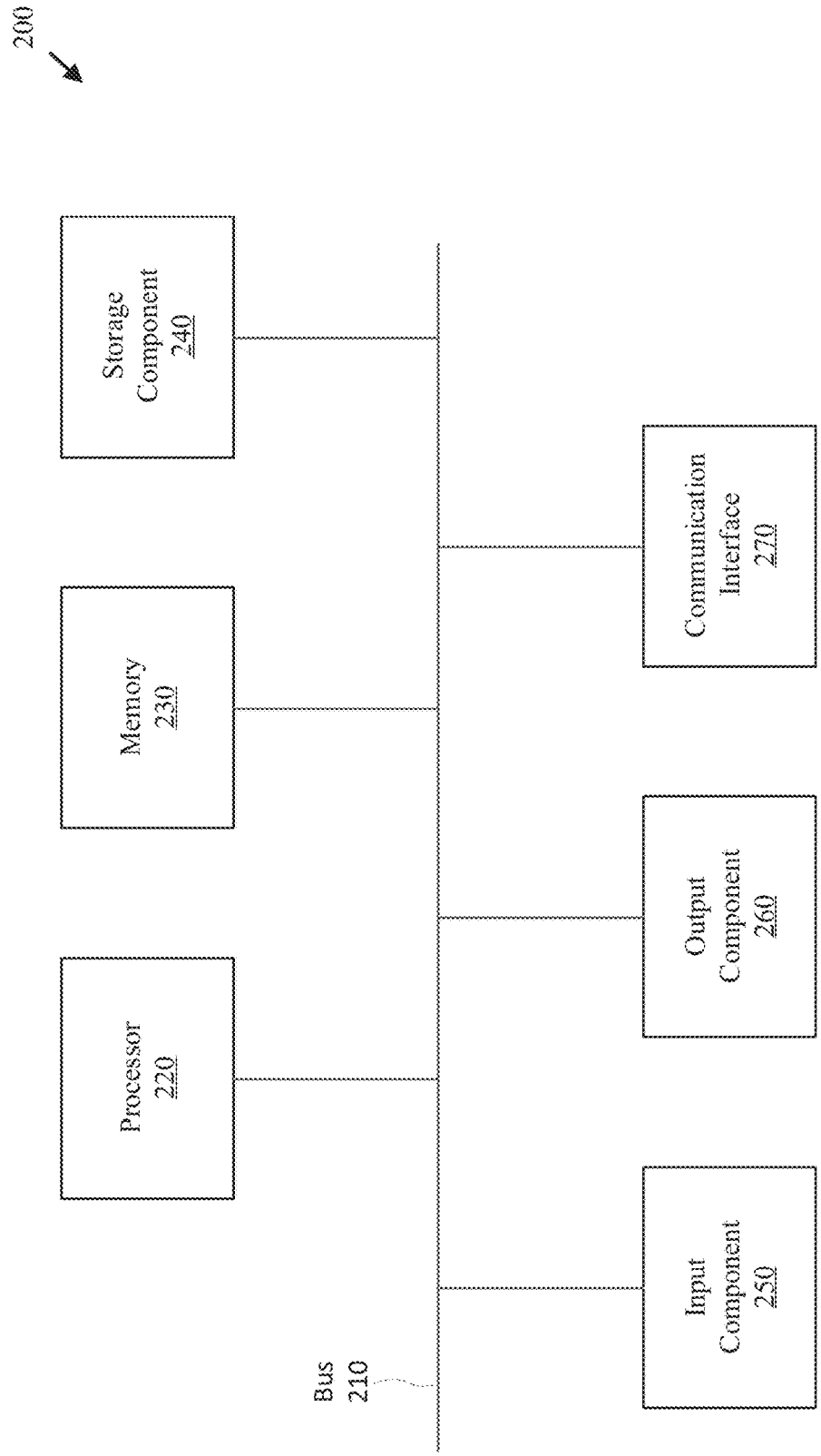
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Figure 3:
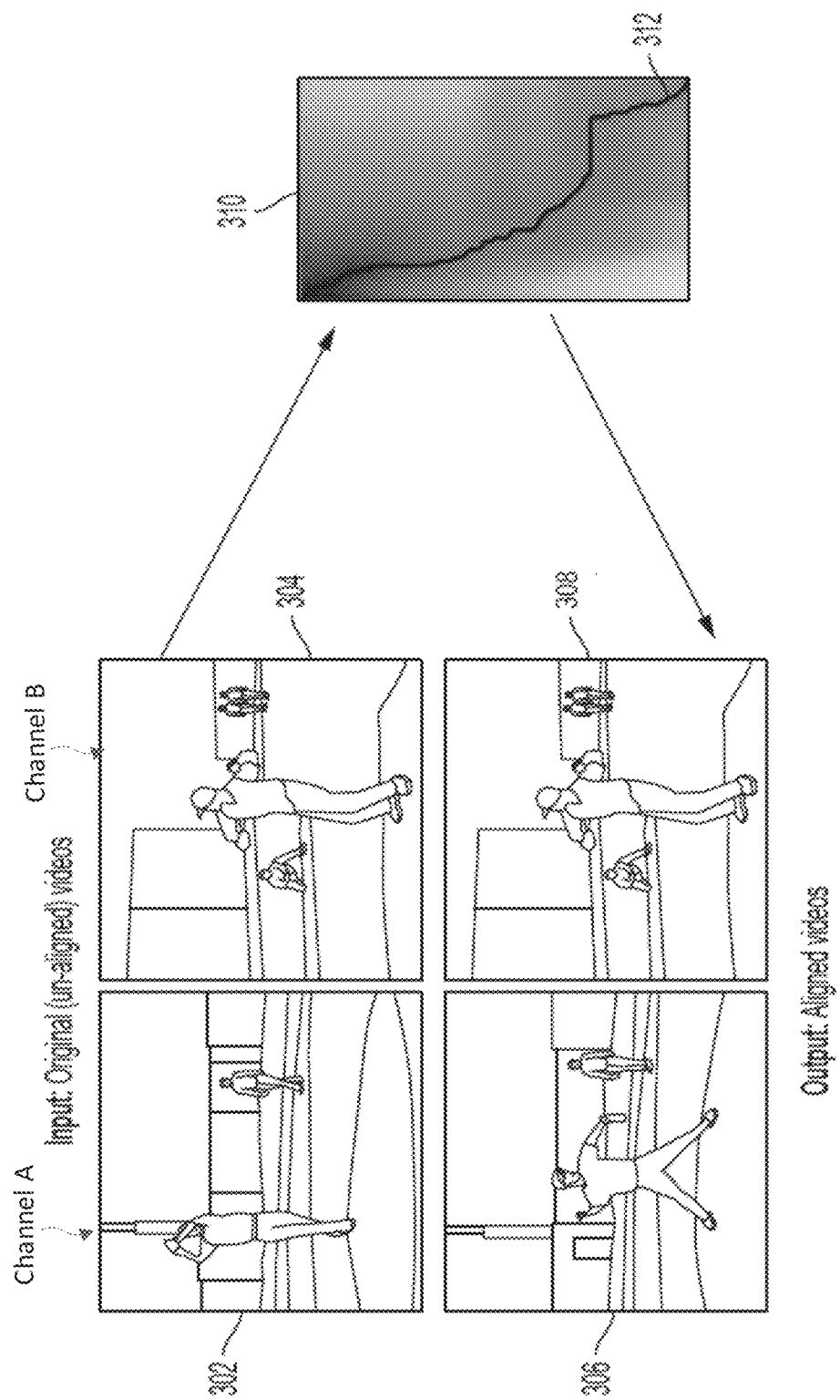
FIG. 3 is a diagram of signal alignment, according to an embodiment.

FIG. 3 is a diagram of signal alignment, according to an embodiment. As shown in FIG. 3, the system may receive un-aligned input signals, such as input frame 302 of channel A and input frame 304 of channel B. Both input frames 302 and 304 show an act of a baseball pitch. However, the timing of the pitch of input frame 302 is not aligned to the timing of the pitch of input frame 304. For example, the specific action shown in frame 302 of channel A does not correspond to the specific action shown in frame 304 of channel B; in frame 302, the ball is above the pitcher's head and in both his hand and the glove, while in frame 304, the ball is the hand reared back below and behind the pitcher's head. The system may identify features in input frame 302 and input frame 304, determine whether the features correspond to each other, and temporally align the signals according to the identified features. Thus, the output frame 306 of channel A is aligned to the output frame 308 of channel B. That is, the timing of the pitch of output frame 306 is aligned with the timing of the pitch of output frame 308; in both frames, the specific actions within the respective pitch sequences correspond to each other.

Graph 310 is a table of frame numbers, with each row denoting a specific frame in channel A and each column denoting a specific frame in channel B. The zeroth frame of both channels is in the top left corner, and the last from of both channels is in the bottom right corner. In graph 310, where the time of the signal of channel A moves in the +X direction and the time of the signal of channel B moves in the −Y direction, the path 312 denotes the optimal alignment path for align the two channels, as is described in detail below. For example, on a specific row, frame a(i) of channel A may be matched with frame b(j) in channel B when the entry on row I and column j is along the path 312. The shading of graph 310 depicts the cost of matching the two prefix sequences ending at frame a(i) of channel A and at frame b(j) of channel B, with darker shading indicating a lower cost of matching. As shown by the path 312, multiple frames from one channel may correspond to a single frame of another channel (i.e., one-to-many matching). The input signals may include multiple modalities. For example, the input signals may include video signals, audio signals, audio-visual signals, textual signals, sensed data (e.g., data sensed from a sensor) or any combination thereof. For example, the system may be configured to identify features in a first audio signal, identify features in a second video signal, and then align the audio signal with the video signal when the identified features correspond, thereby providing cross-modal temporal alignment. As explained in the example below, a "frame" refers to a portion of a sequence at a specific point in time. For example, a frame for a video signal may be a typical image frame, while for a textual signal a frame may be a step, e.g., steps 404-408 described with reference to FIG. 4 may each be a frame.

Figure 4:
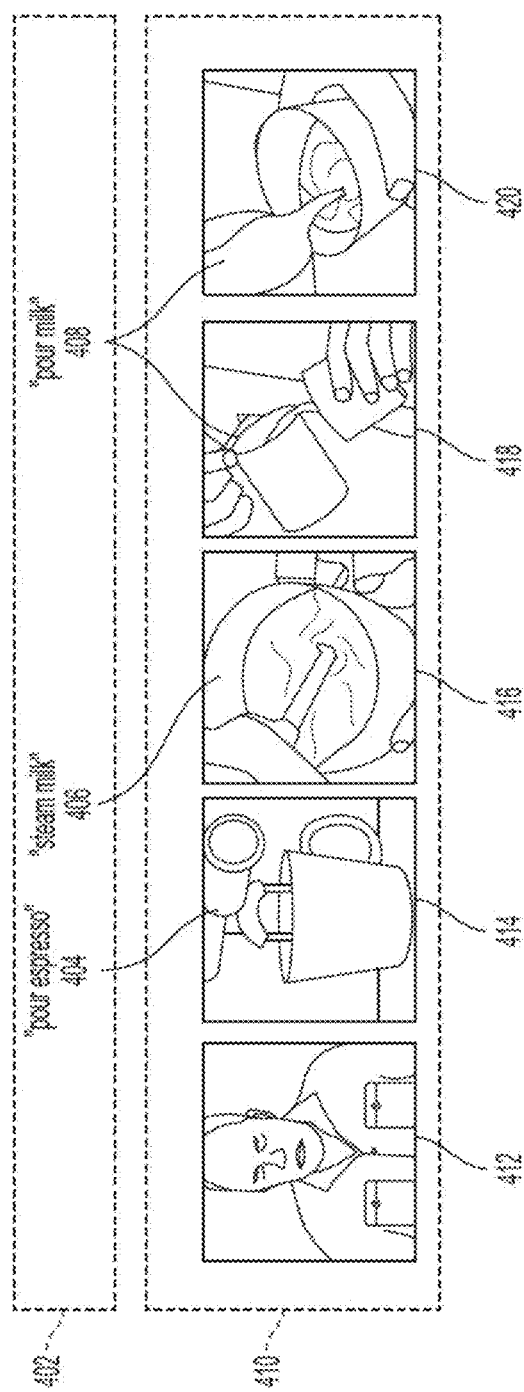
FIG. 4 is a diagram of signal alignment, according to an embodiment.

FIG. 4 is a diagram of signal alignment, according to an embodiment. In FIG. 4, channel A 402 includes a signal with a three step sequence, with the first step 404 being "pour espresso," the second step 406 being "steam milk," and the third step 408 being "pour milk." The signal in channel A 402 may be an audio signal, video signal, textual signal, etc. Channel B 410 includes a video signal with frames 412, 414, 416, 418 and 420. The signal alignment in FIG. 4 may align the steps of channel A 402 with the frames of channel B 410. The system may identify features in steps 404, 406, and 408, and features in frames 412, 414, 416, 418 and 420 for signal alignment. For example, by computing the optimal alignment and then examining that alignment, the system may determine that step 404 corresponds to frame 414, step 406 corresponds to frame 416, and step 408 corresponds to both frames 418 and 420. Determining that step 408 corresponds to both frames 418 and 420 is an example of one-to-many matching, where the system determines that one frame or feature of one channel corresponds to multiple frames or features of another channel. The system may also determine that none of the steps 404, 406 and 408 correspond to frame 412. Thus, upon computing the optimal alignment, the system may identify frame 412 to be an outlier, and may then remove or drop frame 412 from consideration in feature matching, i.e., frame 412 may not be considered in the alignment process for aligning the signal from channel A with the signal from channel B. However, frame 412 would still remain in the signal from channel A, such that frame 412 is presented to a user when the user views (or listens to) the signal for channel A. That is, while the system may determine within a subsequence that a particular item should be dropped, the item may not be dropped until the optimal alignment path for aligning the sequences has been determined.

Although FIG. 4 depicts a preamble frame 412 being identified as an outlier and dropped from consideration, the system may identify content at any position within any signal of the channels to be outliers (e.g., interspersed outliers). Furthermore, in an embodiment, if the system determines that one step of channel A 402 (e.g., step 404) does not correspond to any of the content of the signal of channel B 410, the system may determine that step 404 is an outlier and then drop step 404 from matching consideration. It will be understood by one of skill in the art from the disclosure herein that the embodiments are not limited to two sequences or channels, and that any number of sequences or channels may be utilized without departing from the scope of the disclosure. Furthermore, it will be understood by one of skill in the art from the disclosure herein that the channels are not limited to one particular modality. For example, channel A may include text information, audio information, video information, data, etc., and any combination thereof.

Given two sequences A(t) and B(t), which may be from different modalities, the system may be configured to determine an optimal temporal alignment, as shown in Equation (1):

$$P=\{(a_{i(k)}, b_{j(k)}), k=1, 2, \ldots, K\} \quad (1)$$

where the frame at time $t=a_{i(k)}$ of sequence A(t) matches with the frame at time $t=b_{j(k)}$ of sequence B(t). The path 312 in FIG. 3 depicts the set P for the example shown in FIG. 3. Moreover, the matching P may be restricted to satisfy the ordering constraint, (i.e., a constraint on $a_{i(k)}$ and $b_{j(k)}$), such that P is non-decreasing with respect to the match index k (such that $a_{i(n)} \leq a_{i(m)}$ whenever n<m, and similarly for $b_{j(k)}$). This is an ordering constraint and ensures that the output temporally-aligned sequences, namely OA=$\{A(a_{i(k)}), k=1, \ldots, K\}$ and OB=$\{B(b_{j(k)}), k=1, \ldots, K\}$, include frames from the input sequence A(t) (and B(t), respectively) in the same temporal order that they appear in the input. That is, OA(k) is a subsequence of A(t) preserving the temporal order of A(t) (but possibly with successively duplicated frames where $a_{i(k)}=a_{i(k+1)}$). Similarly, the frames in OB(k) appear in the same temporal order as they do in B(t) (but potentially with duplicates). Any given input frame at time t, (i.e., A(t) (or B(t))), may be dropped (i.e., there is no k such that $t=a_{i(k)}$ (or $t=b_{j(k)}$, respectively)).

The one-to-many matching property may refer to the fact that it is possible to have one frame in either sequence match several frames in the other sequence (e.g., if ai(k)=ai(k+1) then frame t=ai(k) in sequence A matches with frames t=bj(k) and t=bj(k+1) in sequence B). Furthermore, interspersed outliers may refer to frames that may be dropped from anywhere in the two sequences A(t) and B(t), including around endpoints, thereby automatically allowing for subsequence matching.

The present system and method provide optimal temporal alignment that, in particular embodiments, address one-to-many matching or interspersed outliers, or both. Moreover, embodiments of the present system and method provide a differentiable solution which enables feature extractors to be trained. For example, the system trains neural networks which take as an input the data from channel A or channel B (i.e., A(t) and B(t)) and output feature vectors fA(t) or fB(t). These feature vectors may be used to define the input to the optimal matching problem and may be trained, in part, based on minimizing a cost function that depends on the optimal alignment for the current feature set.

The present system and method provide a mechanism to assign a specific drop cost to be used during the optimization for temporal alignment when a frame from channel A or B (or both) are dropped. The choice of which frames from A or B to drop may be determined based on the solution of the optimization problem. Whether or not any individual frame (e.g., A(t)) is dropped depends on the computation of the optimal match. Moreover, this decision may depend on the overall context of the other possible matches between signals A and B. This approach is distinct from approaches that work in two stages, with the first stage deciding which frames from A and B to drop, and then the second stage doing an optimal temporal match of the remaining signals without allowing any further drops. However, in order to perform optimal temporal alignment as a single stage, embodiments of this disclosure define a cost for dropping any given frame. For example, the system defines a drop cost for each frame A(t) and B(t). Whether or not the system determines to pay this cost, or determines to keep the frame A(t) in the temporal match solution P and instead pay a cost for matching A(t) with some frame B(t'), depends on the overall optimization process.

Figure 5:
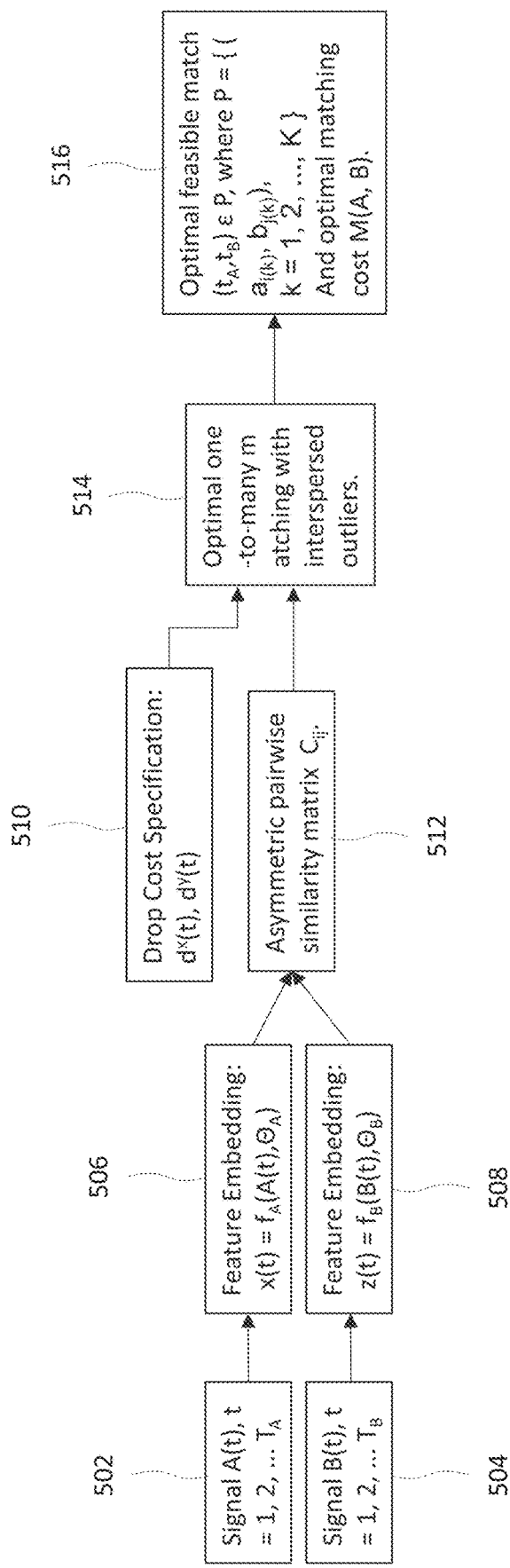
FIG. 5 is a diagram of an overall flow of temporal alignment of signals, according to an embodiment.

FIG. 5 is a diagram of an overall flow of temporal alignment of signals, according to an embodiment. At block 502, the system may receive a first signal of a first channel (e.g., A(t)). At block 504, the system may receive a second signal of a second channel (e.g., B(t)). At block 506, the system may perform feature embedding on the first signal. At block 508, the system may perform feature embedding on the second signal. At block 510, the system may specify drop costs. At block 512, the system may apply an asymmetric pairwise similarity matrix (cost table) to the first signal and/or the second signal. At block 514, the system may produce an optimal one-to-many matching with interspersed outliers based on the specified drop cost and the similarity matrix. At block 516, the system may determine an optimal feasible match and an optimal matching cost. The details regarding the blocks of FIG. 5 are provided below.

At blocks 506 and 508, the system performs feature embedding on the two signals. Feature embedding may include analyzing the signal and identifying features in the signal (e.g., with a neural network). Based on the identified features, the system may determine a vector value (i.e., computing the embedding) at the time index (e.g., a frame) where the feature is identified and then assign the vector value to the time index. After feature embedding is performed, the complete embedded signals x(t) and z(t) are constructed.

At block 514, the solution for the optimal one-to-many matching with interspersed outliers enables applications that are not feasible with other alignment-based alternatives. For example, the system provides for multi-step localization (or video temporal segmentation as shown in FIG. 4) due to the ability to match each step to many frames in a video while automatically dropping outlier frames. Moreover, particular embodiments of the system are constructed to be differentiable, so the output matching cost M(A,B) may be used to train the feature embeddings fA and fB. In other words, the system may be used both at training and during inference.

At block 512, the system may construct a cost table Cij. The cost table Cij may be used at block 514 as well. The cost table Cij may be designed to be contrastive, thereby leading to more robust training that does not require additional considerations for mining negative examples at training time. This training selects appropriate feature embedding parameters $\Theta A$ and $\Theta B$, which in turn results in strong feature embeddings fA and fB.

At block 510, the system may formulate drop costs. Together with block 514, the system provides an efficient computation for the optimal one-to-many matching of signal A(t) to B(t) with dropping of interspersed outliers from either signal. The system (e.g., at block 510) may also be designed to be more flexible, such that the system can either be specified according to the expected amount of outliers or it can automatically be inferred from data during training.

Block 514 may be implemented with differentiable dynamic programming, that solves for the optimal minimum cost matching, which provides for one-to-many matches as well as the ability to drop sequence elements from either input channel (i.e., x(t) or z(t)) from anywhere in either sequence.

FIG. 6 is a diagram of algorithm for subsequence alignment, according to an embodiment.

In the algorithm of FIG. 6, the indexes i and j denote the discrete time t in the feature embedded sequences z(t) and x(t), respectively. Thus, the feature embeddings are as zi=z(i), xi=x(i), and the drop costs are as dzi=dz(t), and dxj=dx(j). In lines 17-21 of the algorithm of FIG. 6, the system provides any combination of matching x(j) with z(i) or dropping one or both of x(i) and z(j). This is supported by the initialization of the tables $D^{zx}$, $D^{z-}$, $D^{x}$, and $D^{--}$ performed in lines 3-6 of the algorithm of FIG. 6. The algorithm of FIG. 6 receives as an input the pairwise cost matrix C(i,j), which is a function of the feature embeddings x(t) and z(t).

The arithmetic minimum operators provided in lines 17-21 of the algorithm of FIG. 6 may be replaced by a differentiable operator, smoothMin. This replacement is a condition for ensuring that the output value for the minimum matching cost D(K,N)=DK,N is differentiable with respect the parameters, namely $\Theta A$ and $\Theta B$, of the feature embeddings shown in FIG. 5. The non-differentiable standard minimum operator may also be used, with some loss in alignment performance.

The feature embedding functions x(t)=fA(A(t),$\Theta A$) and z(t)=fB(B(t),$\Theta B$) may be implemented as neural networks with parameters $\Theta A$ and $\Theta B$. Given values for $\Theta A$ and $\Theta B$ (e.g., from initial guesses or a learning process), the embeddings themselves may be computed. x(t) and z(t) are real-valued vectors in d dimensions. Moreover, these embeddings may be differentiated with respect to the embedding parameters $\Theta A$ and $\Theta B$. Appropriate parameters are learned using stochastic gradient descent (SGD) on a loss function that includes the overall matching cost M(A,B), which is shown as an output of block 514.

In order to compute M(A,B), the system may input the pairwise cost matrix C(i,j) to the optimization block (block 514). C(i,j) may represent the dissimilarity of z(i) and x(j).

Several ways to formulate C(i,j) are disclosed herein. For example, one approach may include defining C(i,j)=1−cos(z(i), x(j)), where cos(z, x)=$z^T x/[\|z\|\|x\|]$ is the cosine of the angle between the two vectors x and z. This quantity increases from zero as the angle between x and y increases and, hence, may represent a dissimilarity function between the directions represented by the vectors x and y. Alternatively, the system may define C(i,j)=−z(j)T x(i), where the inner-product zT x defines the similarity between x and y and the negation −zT x the dissimilarity.

For the purpose of learning $\Theta A$ and $\Theta B$, the system may define the cost matrix C(i,j) as follows. First, the system may define r(i,j)=z(i)T x(j) to be the inner-product of z(i) and x(j). Then, the system may normalize r(i,j) over index i using a softmax operator, so n(i,j)=er(i,j)/α/sum{er(k,j)/α|k=1, . . . K}, where K is the number of items in the sequence z and α>0 is an adjustable parameter. This ensures n(i, j) is non-negative and sums to one over the first index, namely i. n(i,j) has a strong peak value near one only if there is a match (i, j) with an inner-product r(i,j) that is much larger than any other inner-product (e.g., r(i', j) for i'≠i), for the same index j of sequence x. Such a property of n(i,j) may be used with a clearly distinguished matching element for frame x(j) (namely z(i*), where i*=argmax{n(k, j)|k=1, . . . , K}. The system may define C(i,j) to be the negative log of n(i,j), so C(i,j)=−log(n(i,j)).

Due to the normalization of n(i,j) over the entire sequence z(k), for k=1, 2, . . . , K, this definition of C(i,j) is not symmetric in the choice of sequence A and B.

In order to compute the minimum alignment cost, M(A, B)=DK,N in the algorithm of FIG. 6, the system may compute the minimum value of several sets of numbers (on lines 17-21 of the algorithm of FIG. 6). While these min operations may be easily implemented exactly, doing so introduces discontinuities in the gradient of optimal matching score with respect to the embedding parameters OA and OB.

To avoid these gradient discontinuities, the system may train the feature embeddings using the smoothMin operator instead of the min, as in Equation (2):

$$smoothMin(a;\gamma) = \begin{cases} \min\{a_i \mid 1 \le i \le N\}, & \gamma = 0 \\ \dfrac{\sum_{i=1}^{N} a_i e^{-a_i/\gamma}}{\sum_{j=1}^{N} a_j e^{-a_j/\gamma}}, & \gamma > 0 \end{cases} \quad (2)$$

where N is the length of the input vector a. The convexity property in terms of the gap between the smallest and second smallest value in $\{a1, \ldots, an\}$ is advantageous, as this convexity encourages the features to produce one clear minimum value over near ties. Equation (2) may be utilized as opposed to the min$\gamma$ of Equation (3).

$$\min_\gamma\{a_1, \ldots, a_n\} = \begin{cases} \min_{i \le n} a_i, & \gamma = 0 \\ -\gamma \log \sum_{i=1}^{n} a_i e^{-a_i/\gamma}, & \gamma > 0 \end{cases} \quad (3)$$

Figure 7:
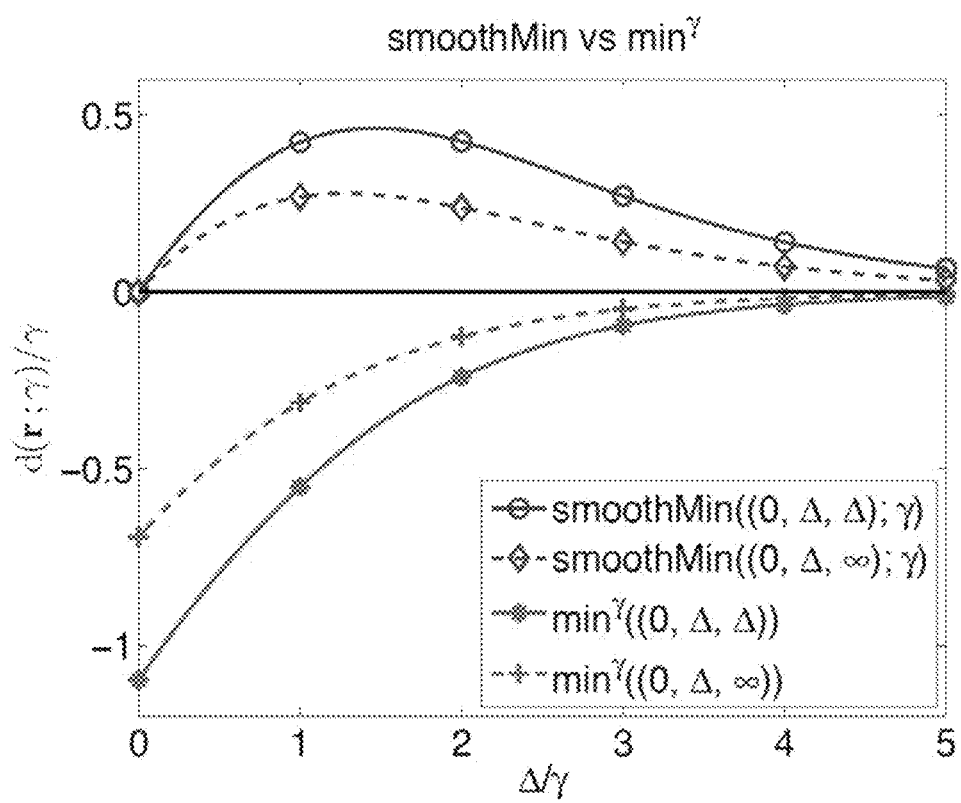
FIG. 7 is a diagram of a graph showing performance of minimization functions, according to an embodiment.

FIG. 7 is a diagram of a graph showing performance of minimization functions, according to an embodiment. One difference between min$\gamma$ of Equation (3) and smoothMin of Equation (2) may be illustrated with examples of just three elements r=(a1, a2, a3). The system may define a*=min(a1, a2, a3) and define d(r; $\gamma$) to be the difference between the smooth approximation for the min operator and the true min. That is, d(r; $\gamma$)=smoothMin(r; $\gamma$)−a*, or d(r; $\gamma$)=min$\gamma$(r; $\gamma$)−a*.

FIG. 7 illustrates the property that smoothMin is an upper bound for the true min a*(i.e., d(r; $\gamma$)>=0). Moreover, an important property of smoothMin, for the purpose of training the feature embedding functions (e.g., x(t), z(t), etc.), is that smoothMin is convex up in the regime where the smallest value a* is separated from the second smallest value by at least 2 $\gamma$ (i.e., $\Delta$>=2 $\gamma$). This sign of convexity encourages the values input to the smooth minimum operators to have one clear minimum with the other values well separated from it (i.e., larger $\Delta$ are preferred). This is in contrast to min$\gamma$(a; $\gamma$), which encourages ties (i.e., $\Delta$=0).

In block 510 of FIG. 5, the system assigns the drop costs. The system may define dz and dx to be the constant value s, where s is defined in terms of the cost matrix Ci,j. Specifically, the system may define s to be, as in Equation (4):

$$s = \text{percentile}(\{C_{i,j} \mid 1 \le i \le K, 1 \le j \le N\}, p) \quad (4)$$

where percentile(S, p) finds the pth percentile value (in terms of increasing order) from the set S of real numbers. Thus, percentile(S, 100)=max(S), percentile (S, 0)=min(S) and percentile(S, 50)=median(S). Defining the drop cost in terms of the percentile p has the effect of introducing a prior expectation for the fraction (i.e., p/100) of the input sequences that are expected to match. While injecting prior knowledge in the system using the percentile drop cost may be an advantage, it may be difficult to do so when the expected level of noise is unknown. To address this scenario, the system may use an instantiation of a learnable drop cost. The system may define the outliers drop costs in X based on the content of sequence Z, as shown in Equation (5):

$$d^x = X \cdot f_{w_x}(\overline{Z}); d^z = Z \cdot f_{w_z}(\overline{X}) \quad (5)$$

where $\overline{Z}, \overline{X}$ are the respective means of sequences Z;X, and fw(·) is a learnable function (i.e., a feedforward neural net) parametrized by w. Equation (5) provides a more adaptable system.

FIG. 8 is a diagram of an algorithm for subsequence alignment, according to an embodiment. In one embodiment, to model element dropping, the system utilizes drop costs, such that every element of sequence X and Z has an associated drop cost (i.e., $d^z_i$ and $d^x_j$ respectively). For example, if element z1 in sequence Z has not been matched to any element in sequence X, the system considers element z1 to be dropped, which incurs a cost of $d^z_i$. In order to process drops, the system may simultaneously (or semi-simultaneously) populate four dynamic programming (D) tables $D^{zx}$, $D^{z-}$, $D^{-x}$, and $D^{--}$, as well as corresponding path (P) tables $P^{zx}$, $P^{z-}$, $P^{-x}$, and $P^{--}$, that include optimal predecessors for every element in every table. $D^{zx}_{i,j}$ includes the costs of aligning subsequences $Z_{1:i}$ and $X_{1:j}$, given that their endpoints match. $D^{z-}_{i,j}$ includes the costs of aligning subsequences $Z_{1:i}$ and $X_{1:j}$, given that $x_j$ (the last element of subsequence $X_{1:j}$) has been dropped, and $z_i$ has been previously matched to some element in $X_{1:j-1}$. $D^{-x}_{i,j}$ includes the costs of aligning subsequences $Z_{1:i}$ and $X_{1:j}$, given that $z_i$ (the last element of subsequence $Z_{1:i}$) has been dropped, and $x_j$ has been previously matched to some element in $Z_{1:i-1}$. $D^{--}_{i,j}$ includes the costs of aligning subsequences $Z_{1:i}$ and $X_{1:j}$, given that both $z_i$ and $x_j$ were dropped.

In order to determine the optimal alignment path, the system may store optimal predecessors in separate tables (alternatively, the system may identify predecessors based on cost increments). Since there is four dynamic programming tables, the system includes four corresponding tables with pointers to the optimal predecessors $P^{zx}$, $P^{z-}$, $P^{-x}$, and $P^{--}$. For instance, the value in the cell $P^{z-}_{i,j}$ points to the optimal predecessor of the element [i,j], in the optimal alignment, given that the $x_i$ has been dropped. Pointing to the optimal predecessor may refer to the pointer indicating the location of a predecessor in a dynamic table that leads to a minimum cost.

Referring back to FIG. 4, in the following example embodiment, the sequence 402 corresponds to sequence Z, and the sequence 410 corresponds to sequence X. Referring to lines 3-10 of the algorithm of FIG. 8, the system performs initialization to enforce the space of feasible paths at the first iteration of the algorithm. In lines 12-13 of the algorithm of FIG. 8, the system loops over all cells of the D tables and the P tables to fill the tables. For every cell, the system performs the same computations to find the D and P table values and the optimal predecessor. In the example algorithm of FIG. 8, each iteration applies the same rules to create the tables for that iteration, and therefore the application of those rules to a specific iteration of the example sequences of FIG. 4 is described below.

In a case where i=2 and j=3, which corresponds to matching the text subsequence of "pour espresso" 404 and "steam milk" 406 of sequence 402 to the subsequence including frames 412, 414 and 416 in sequence 410. The system populates the values of all the D and P tables at location [i=2, j=3] (i.e., determining $D^{zx}_{2,3}$, $D^{z-}_{2,3}$, $D^{-x}_{2,3}$, and $D^{--}_{2,3}$). Line 16 of the algorithm of FIG. 8, according to this example embodiment, is as in Equation (6).

$$D^{z-}_{2,3} = d^x_3 + \min[D^{zx}_{2,2}, D^{z-}_{2,2}] \quad (6)$$

$D^{z-}_{2,3}$ is the cost of aligning subsequences "pour espresso" 404 and "steam milk" 406 with video frames 412 and 414, given that the video frame 416 is dropped. The first term on the right-hand side $d^x_3$ is the cost of dropping frame 416. Then, the system uses the immediate prefix sequence alignment with the minimum cost. Particularly, the system considers $D^{zx}_{2,2}$ (i.e., the alignment cost of "pour espresso" 404 and "steam milk" 406 to frames 412 and 414, given that the endpoints are aligned), and $D^{z-}_{2,2}$ (i.e., "pour espresso" 404 and "steam milk" 406 to frames 412 and 414, given that the last frame 416 had been dropped). The system may only consider these two prefix sequences as only such predecessors in the optimal path satisfy the constraints on path feasibility. Similarly, the system may fill in the remaining table values $D^{zx}_{2,3}$, $D^{-x}_{2,3}$, $D^{--}_{2,3}$.

The system may define multiple D and P tables and the particular rules to fill the tables, such that the resulting D and P tables lead to the solution of sequence alignment with element dropping. Furthermore, the system does not align "steam milk" 406 with frame 416, or drop either of them at this point. Rather, the system computes the costs for aligning the subsequences that end with those elements, and then proceeds to the next computation. The system decides whether these elements are dropped or matched after all the D and P table cells are filled using back tracing.

When the system determines the values for the [i, j] cell in each D and P table (e.g., lines 15-18 of the algorithm of FIG. 8), the system considers the optimal predecessors that resulted in the optimal value at each cell in order to determine the optical alignment path. In this embodiment, the information that they system stores in $P^{z-}_{2,3}$ is the pointer to the predecessor cell that leads to the optimal value at the current cell. $P^{z-}_{2,3}$ is determined as in Equation (7).

$$P^{z-}_{2,3} = \mathrm{argmin}[D^{zx}_{2,2}, D^{z-}_{2,2}] \quad (7)$$

The argmin operation returns the location of the minimum elements. For example, if $D^{zx}_{2,2}$ is the minimum element (i.e., $D^{zx}_{2,2} < D^{z-}_{2,2}$), the argmin will return a tuple (2, 2, zx). The first two entries in the tuple are the [i=2,j=2] location of the minimum element $D^{zx}_{2,2}$, and the last entry is the table type from which it comes (i.e., from zx table as in the superscript of $D^{zx}$). Now, the element $P^{z-}_{2,3}$ stores the pointer (2, 2, zx), that points to the element [i=2,j=2] of table $P^{zx}$ (i.e., $P^{zx}_{2,2}$). The system analogously fills in the values of $P^{zx}_{2,3}$, $P^{-x}_{2,3}$, $P^{--}_{2,3}$. After every cell of the path table has been filled with the pointer to the optimal predecessor, the system will be able to compute the optimal alignment path by following the pointers backwards in time (e.g., starting at the end points of the sequences).

Lines 26-28 of the algorithm of FIG. 8 correspond to the optimal alignment cost and path computation. Once all the D and P tables have been filled, the system will have access to the values $D^{zx}_{3,4}$, $D^{z-}_{3,4}$, $D^{-x}_{3,4}$, $D^{--}_{3,4}$ (these D and P tables correspond to matching full text and frame sequences of FIG. 4, as the length of text sequence is K=3 and of frame sequence N=4). All those costs correspond to optimal alignment, condition upon whether or not one or both endpoints (i.e., $z_3$ and $x_4$) were dropped. The optimal alignment cost may be the minimum between these four options. In line 26 of the algorithm of FIG. 8, the system computes the alignment cost by taking the minimum over possible alignment costs.

Similarly, in line 27 of the algorithm of FIG. 8, the system identifies the pointer to the optimal predecessor that results in the minimum alignment cost determined in line 26 of the algorithm of FIG. 8. After that pointer is defined, in line 28 of the algorithm in FIG. 8, the system determines the optimal alignment by tracing back the pointers to the beginning [i=0, j=0]. After all the steps have been performed, the system returns the optimal cost of alignment and the corresponding alignment path with the elements to be dropped.

Figure 9:
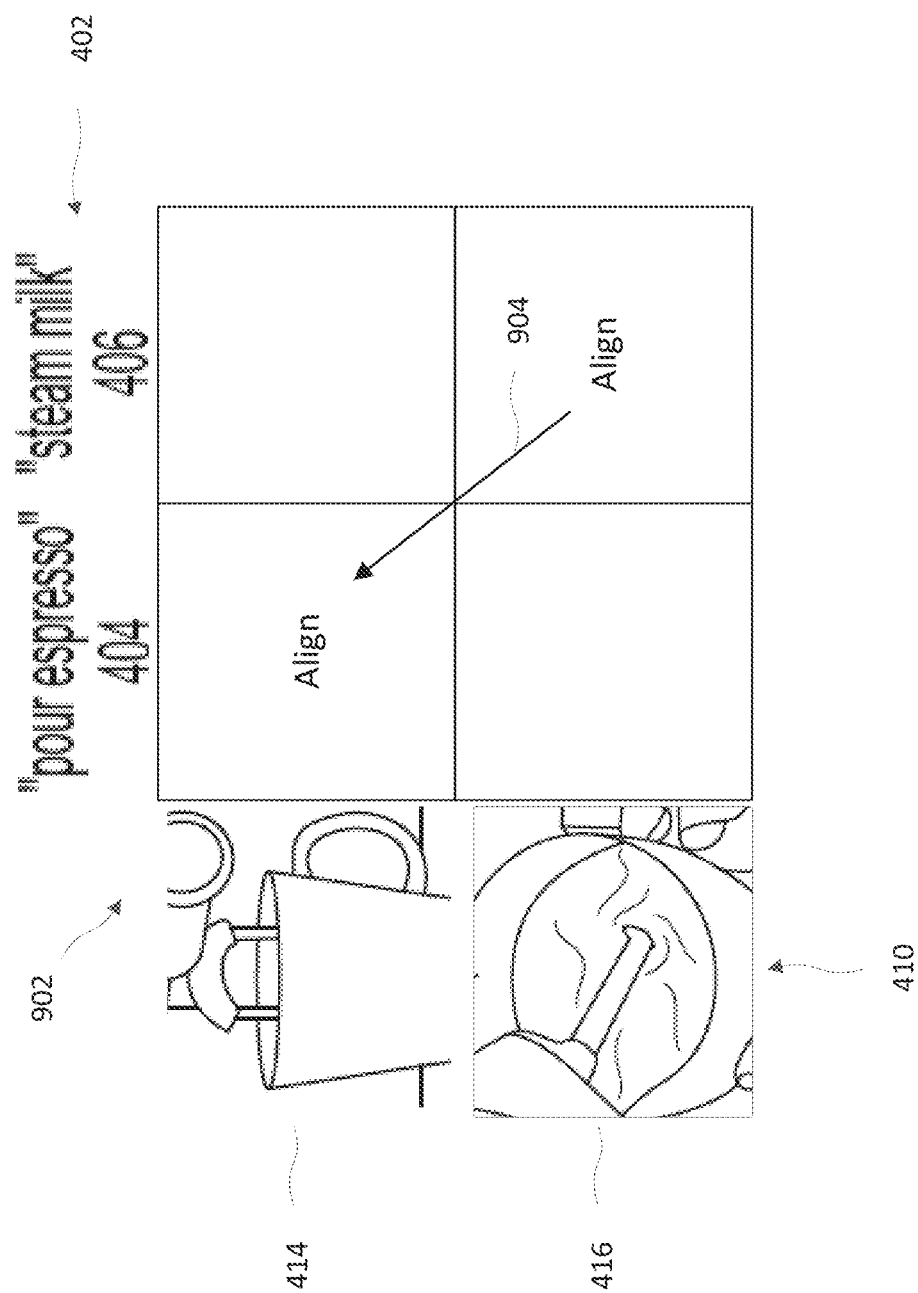
FIG. 9 is a diagram of a dynamic programming table, according to an embodiment.

FIG. 9 is a diagram of a dynamic programming table, according to an embodiment. When tracing back a matching path, the system may select table 902, as table 902 (i.e., not dropping text 406 or frame 416) includes a minimum cost matching path where two matching can occur with a low cost (i.e., other tables may include a minimum cost matching path that have at least one cost that is higher than the cost in the minimum cost matching path in table 902). In determining table 902, the system may determine a pointer 904 that points back to the element (e.g., the optimal predecessor) where the system determined the cost for matching the elements was lowest (e.g., matching text 404 with frame 414).

Figure 10:
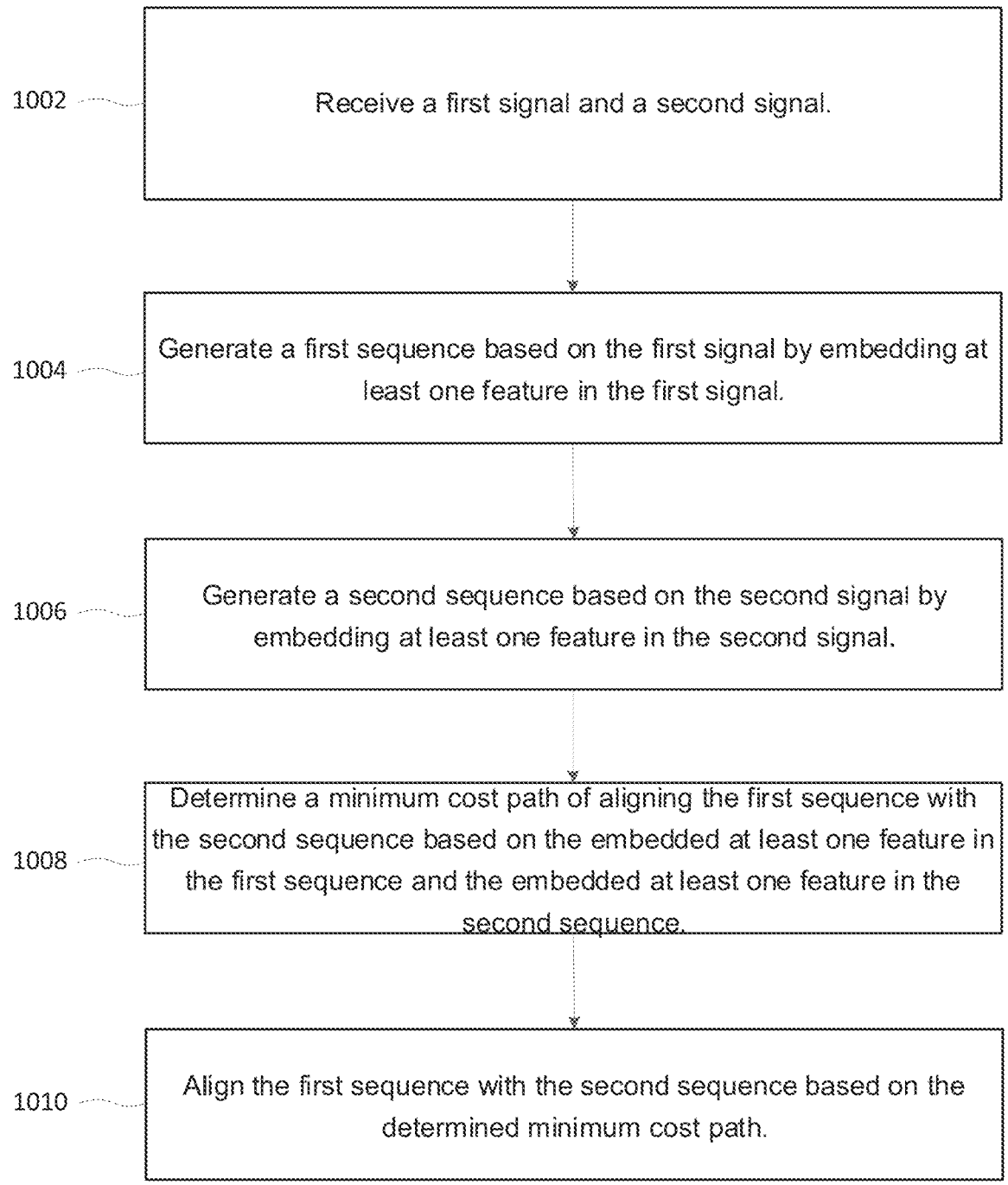
FIG. 10 is a flowchart of a method of signal alignment, according to an embodiment.

FIG. 10 is a flowchart of a method of signal alignment, according to an embodiment. In operation 1002, the system receives a first signal and a second signal. In operation 1004, the system generates a first sequence based on the first signal by embedding at least one feature in the first signal. In operation 1006, the system generates a second sequence based on the second signal my embedding at least one feature in the second signal. In operation 1008, the system determines a minimum cost path of aligning the first sequence with the second sequence based on the embedded at least one feature in the first sequence and the embedded at least one feature in the second sequence. In operation 1010, the system aligns the first sequence with second sequence based on the determined minimum cost path.

The foregoing embodiments may be implemented to, for example, temporally align a pair of video clips, with each video depicting a subject performing a particular exercise (such as a squat, or a push-up). Temporal alignment of a user's clip with an instructor's clip would serve as the basis for timing annotations in the user's clip which were originally provided in synch with the instructor's clip.

The temporal alignment of a user's clip with other clips of the same activity, such as a soccer kick, implies that the system may identify the temporal phase of the activity in the user's clip (roughly, for a soccer kick, the foot plant, swinging phase, ball contact and follow through). By annotating one video with names for the phases of the motion, the system may transfer these annotations to any other video of this activity. This ability to identify temporal phase of the activity enables action highlight detection. In such an example, the automatic selection of a highlight from the user's video (say, a single frame, or a slow-motion excerpt) could select from just the swinging phase through to the ball contact. For example, with a sequence A(1:T), the system has a set of labels such that times t1 and t2 correspond to frames in the sequence, such as frames where a person is kicking a ball. With another sequence B(1:S), the system has a set of labels that times t3 and t4 correspond to frames in the sequence where another person is kicking a ball. With the temporal alignment disclosed herein, the frames corresponding to A(1,2) may be aligned with the frames corresponding to B(3,4). Furthermore, the labels from A(1,2) may be transferred to B(3,4).

The foregoing embodiments may enable users to temporally align videos of similar actions for the purpose of video editing to share the aligned content on social media (e.g., to compare one user's soccer kick in a split frame display with another user).

The foregoing embodiments may provide fine-grained audio-visual retrieval where the system may use the alignment method to retrieve a specific moment from a video given an audio signal and vice-versa.

The foregoing embodiments may provide activity matching and detection. The system may compute a temporal alignment between two sequences and then define when each of the steps is being depicted in the video and, hence, this enables the system to detect activities in the video sequence The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving a first signal and a second signal;
    generating a first sequence based on the first signal by embedding at least one feature in the first signal;
    generating a second sequence based on the second signal by embedding at least one feature in the second signal;
    determining a minimum cost path of aligning the first sequence with the second sequence based on the embedded at least one feature in the first sequence and the embedded at least one feature in the second sequence; and
    aligning the first sequence with the second sequence based on the determined minimum cost path;
    wherein determining the minimum cost path of aligning the first sequence with the second sequence comprises determining a plurality of dynamic programming tables, and
    wherein the plurality of dynamic programming tables comprise:
        a first dynamic programming table having a first alignment cost based on aligning at least one sequence frame of the first sequence with at least one sequence frame of the second sequence;
        a second dynamic programming table having a second alignment cost based on a predetermined sequence frame of the second sequence being dropped;
        a third dynamic programming table having a third alignment cost based on a predetermined sequence frame of the first sequence being dropped; and
        a fourth dynamic programming table having a fourth alignment cost based on the predetermined sequence frame from the first sequence being dropped and the predetermined sequence frame from the second sequence being dropped.

2. The method of claim 1, wherein determining the minimum cost path of aligning the first sequence with the second sequence comprises:
    determining a minimum cost from among the first alignment cost, the second alignment cost, the third alignment cost, and the fourth alignment cost.

3. The method of claim 1, further comprising generating a pointer to a predecessor cell based on the determined minimum cost path.

4. The method of claim 1, wherein the minimum cost path is determined by drop costs that are based on a percentile value based on a cost matrix.

5. A system, comprising:
    a memory storing instructions; and
    a processor configured to execute the instructions to:
        receive a first signal and a second signal;
        generate a first sequence based on the first signal by embedding at least one feature in the first signal;
        generate a second sequence based on the second signal by embedding at least one feature in the second signal;
        determine a minimum cost path of aligning the first sequence with the second sequence based on the embedded at least one feature in the first sequence and the embedded at least one feature in the second sequence; and
        align the first sequence with the second sequence based on the determined minimum cost path;
    wherein the processor is further configured to determine the minimum cost path of aligning the first sequence with the second sequence by determining a plurality of dynamic programming tables, and
    wherein the plurality of dynamic programming tables comprise:
        a first dynamic programming table having a first alignment cost based on aligning at least one sequence frame of the first sequence with at least one sequence frame of the second sequence;
        a second dynamic programming table having a second alignment cost based on a predetermined sequence frame of the second sequence being dropped;
        a third dynamic programming table having a third alignment cost based on a predetermined sequence frame of the first sequence being dropped; and
        a fourth dynamic programming table having a fourth alignment cost based on the predetermined sequence frame from the first sequence being dropped and the predetermined sequence frame from the second sequence being dropped.

6. The system of claim 5, wherein the processor is configured to determine the minimum cost path of aligning the first sequence with the second sequence by determining a minimum cost from among the first alignment cost, the second alignment cost, the third alignment cost, and the fourth alignment cost.

7. The system of claim 5, wherein the processor is further configured to generate a pointer to a predecessor cell based on the determined minimum cost path.

8. The system of claim 5, wherein the minimum cost path is determined by drop costs that are based on a percentile value based on a cost matrix.

9. A non-transitory computer-readable storage medium connected to at least one processor and storing instructions that, when executed, cause the at least one processor to:
- receive a first signal and a second signal;
- generate a first sequence based on the first signal by embedding at least one feature in the first signal;
- generate a second sequence based on the second signal by embedding at least one feature in the second signal;
- determine a minimum cost path of aligning the first sequence with the second sequence based on the embedded at least one feature in the first sequence and the embedded at least one feature in the second sequence; and
- align the first sequence with the second sequence based on the determined minimum cost path;
- wherein the instructions, when executed, further cause the at least one processor to determine the minimum cost path of aligning the first sequence with the second sequence by determining a plurality of dynamic programming tables, and
- wherein the plurality of dynamic programming tables comprise:
  - a first dynamic programming table having a first alignment cost based on aligning at least one sequence frame of the first sequence with at least one sequence frame of the second sequence;
  - a second dynamic programming table having a second alignment cost based on a predetermined sequence frame of the second sequence being dropped;
  - a third dynamic programming table having a third alignment cost based on a predetermined sequence frame of the first sequence being dropped; and
  - a fourth dynamic programming table having a fourth alignment cost based on the predetermined sequence frame from the first sequence being dropped and the predetermined sequence frame from the second sequence being dropped.

10. The storage medium of claim 9, wherein the instructions, when executed, cause the at least one processor to determine the minimum cost path of aligning the first sequence with the second sequence by determining a minimum cost from among the first alignment cost, the second alignment cost, the third alignment cost, and the fourth alignment cost.

11. The storage medium of claim 9, wherein the minimum cost path is determined by drop costs that are based on a percentile value based on a cost matrix.

* * * * *